(12) United States Patent
Fujiwara et al.

(10) Patent No.: US 9,150,098 B2
(45) Date of Patent: Oct. 6, 2015

(54) REINFORCEMENT STRUCTURE FOR A VEHICLE FUEL FILLER TUBE

(71) Applicant: Nissan North America, Inc., Franklin, TN (US)

(72) Inventors: Souichi Fujiwara, Novi, MI (US); Carrie Dubay, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 557 days.

(21) Appl. No.: 13/650,207

(22) Filed: Oct. 12, 2012

(65) Prior Publication Data
US 2014/0103039 A1 Apr. 17, 2014

(51) Int. Cl.
*B60K 15/01* (2006.01)

(52) U.S. Cl.
CPC ..................... *B60K 15/01* (2013.01)

(58) Field of Classification Search
CPC .... B60K 15/0406; B60K 15/04; B60K 15/01; B60K 15/00; F01P 11/0214
USPC .......... 220/86.2, 86.1; 248/689, 316.1, 309.1; 138/172
See application file for complete search history.

(56) References Cited

FOREIGN PATENT DOCUMENTS

| EP | 1852298 B1 | 1/2009 |
|----|------------|--------|
| EP | 1852297 B1 | 7/2009 |

OTHER PUBLICATIONS

Images of Toyota Camry fuel filler tube, Model Year 2012, Available at least as early as 2012.
Images of Toyota Highlander fuel filler tube, Model Year 2008, Available at least as early as 2008.

*Primary Examiner* — Robert J Hicks
(74) *Attorney, Agent, or Firm* — Young, Basile, Hanlon & MacFarlane, P.C.

(57) ABSTRACT

A vehicle fuel filler tube comprises: a fuel filler tube configured to fluidly connect a fuel filler adaptor with a fuel reservoir and having an exposed segment; an elastomeric sleeve at least partially circumscribing the exposed segment; and a rigid reinforcement plate at least partially overlaying the sleeve, the plate extending longitudinally along a circumferential portion of the exposed segment and shaped to approximate a contour of the exposed segment.

17 Claims, 3 Drawing Sheets

REINFORCEMENT STRUCTURE FOR A VEHICLE FUEL FILLER TUBE

TECHNICAL FIELD

The embodiments disclosed herein generally relate to fuel filler tube assemblies for vehicles.

BACKGROUND

Vehicles, such as passenger vehicles and commercial vehicles, may have fuel filler tube assemblies including, among other components, a fuel filler tube configured to convey fuel from a fuel filler adaptor located at the exterior of the vehicle to a fuel reservoir located underneath the vehicle. Due to design or other considerations, it may be desirable to include a reinforcement structure for one or more portions of the fuel filler tube.

SUMMARY

Disclosed herein are embodiments of a reinforcement structure for a vehicle fuel filler tube. In one aspect, a fuel filler tube assembly for a vehicle comprises: a fuel filler tube configured to fluidly connect a fuel filler adaptor with a fuel reservoir and having an exposed segment; an elastomeric sleeve at least partially circumscribing the exposed segment; and a rigid reinforcement plate at least partially overlaying the sleeve, the plate extending longitudinally along a circumferential portion of the exposed segment and shaped to approximate a contour of the exposed segment.

In another aspect, a vehicle comprises: a vehicle body structure housing a fuel reservoir and including a fuel filler adaptor at an exterior thereof; a fuel filler tube routed within the vehicle body structure and configured to fluidly connect the fuel filler adaptor with the fuel reservoir, the fuel filler tube having an exposed segment; an elastomeric sleeve at least partially circumscribing the exposed segment; and a rigid reinforcement plate at least partially overlaying the sleeve, the plate extending longitudinally along a circumferential portion of the exposed segment and shaped to approximate a contour of the exposed segment.

These and other aspects will be described in additional detail below.

BRIEF DESCRIPTION OF THE DRAWINGS

The various features, advantages and other uses of the present apparatus will become more apparent by referring to the following detailed description and drawing in which.

DETAILED DESCRIPTION

Disclosed herein is a fuel filler tube assembly for a vehicle that includes a fuel filler tube and a reinforcement structure for the fuel filler tube.

Figure 1:
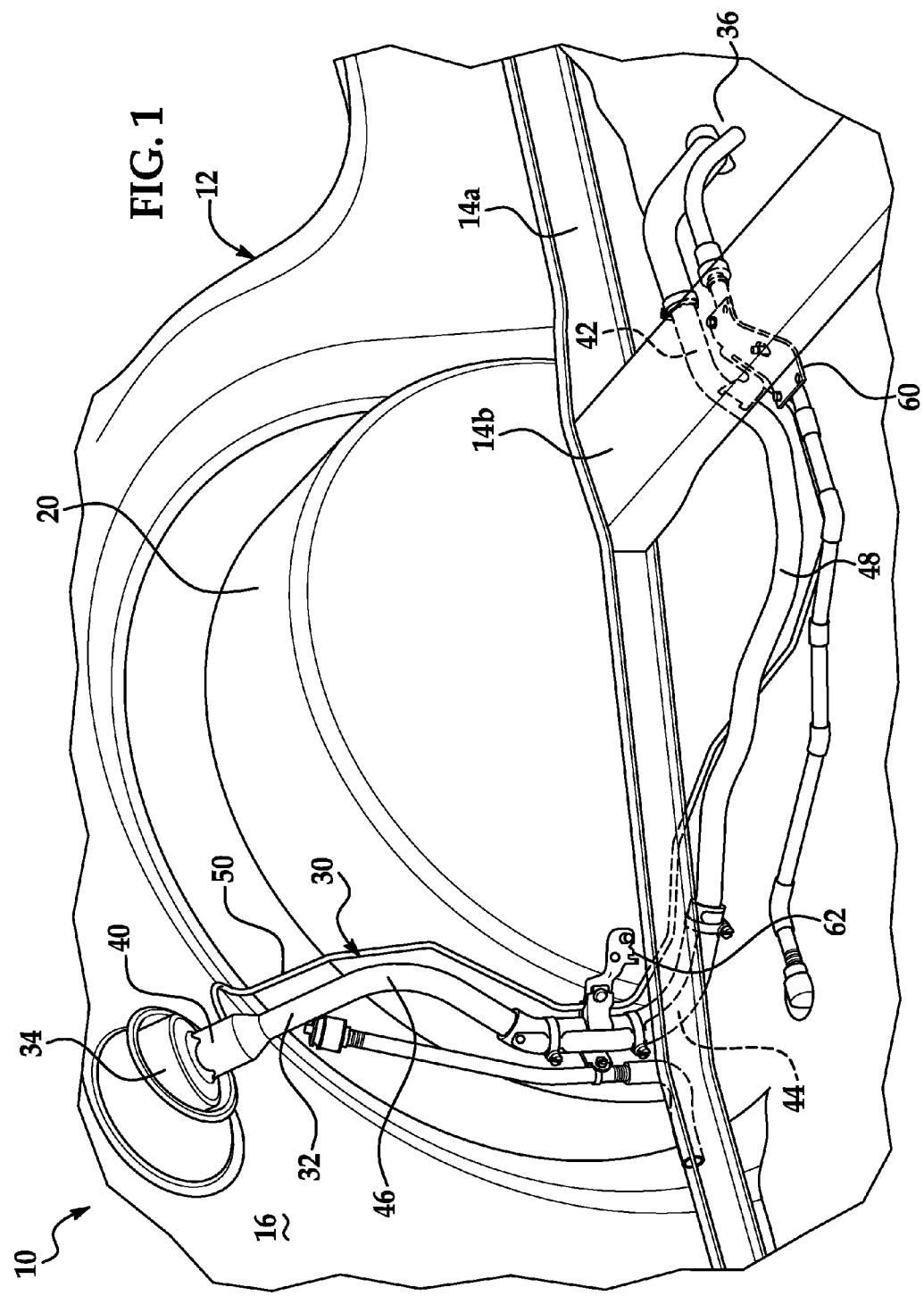
FIG. 1 is a partial cut away perspective view of a vehicle body structure showing a fuel filler tube assembly including a fuel filler tube.

FIG. 1 is a partial cut away view of a vehicle body structure 12 for a vehicle 10. As a non-limiting example, the vehicle body structure 12 can include any number of frame components 14a and 14b, body panels 16 and wheelhouse panels 20, as shown, and can also include floor panels, trim pieces and a variety of powertrain and driveline components, for example.

As shown in FIG. 1, a fuel filler tube assembly 30 is disposed within the vehicle body structure 12. The fuel filler tube assembly 30 includes a fuel filler tube 32, which is a hollow tubular structure configured to convey fuel from a fuel filler adaptor 34 to a fuel reservoir 36 generally positioned on an underside of the vehicle 10. The fuel filler adaptor 34 is in fluid communication with a first distal end 40 of the fuel filler tube 32. The fuel filler adaptor 34 may be mounted to the body panel 16, for example, to provide fluid access to the fuel reservoir 36 from an exterior of the vehicle 10 via the fuel filler tube 32. The illustrated fuel filler adaptor 34 is configured for accepting the nozzle of a conventional vehicle fuel dispenser, although the fuel filler adaptor 34 could alternatively be configured for use with other fuel dispensers.

The first distal end 40 of the fuel filler tube 32 can be integral with the fuel filler adaptor 34, for example, or could be fitted to the fuel filler adaptor 34 using hoses, clamps or other suitable attachment devices. A second distal end 42 of the fuel filler tube 32 in fluid communication with the fuel reservoir 36 can similarly be integral with the fuel reservoir 36, for example, or could be fitted to the fuel reservoir 36 using hoses, clamps or other suitable attachment devices.

The fuel filler 32 tube could have a circular, ovoid, oblong or polygonal cross section, for example, or a combination thereof, and can be shaped and sized for routing through the vehicle body structure 12 according to a combination of design, space, safety or regulatory constraints, for example. The illustrated fuel filler tube 32 is non-linear and includes an elbow portion 44 integrally connecting a generally vertical segment 46 extending downward from the fuel filler adaptor 34 and a generally horizontal segment 48 extending along the underside of the vehicle 10 to the fuel reservoir 36.

The illustrated fuel filler tube assembly 30 may further include a recirculation tube 50. The recirculation tube 50 is a generally hollow tube configured to convey fuel vapor or other gases from the fuel reservoir 36 to an exterior of the vehicle 10 via, for example, the fuel filler adaptor 34, such that gases do not become trapped within the fuel reservoir 36 during refueling. The recirculation tube 50 is shaped for routing through the vehicle body structure 12 generally along the path of the fuel filler tube 32, although the recirculation tube 50 could be alternatively shaped or routed. The fuel filler tube 32 and the recirculation tube 50 can be composed of any suitable fuel and/or chemical-resistant material, such as electro-coated steel, for example.

As shown in FIG. 1, the fuel filler tube 32, as well as the other components of the fuel filler tube assembly 30, is secured to the vehicle body structure 12 at various points. The fuel filler tube 32 can be secured with respect to the vehicle body structure 12 through one or more mechanical couplings, such as brackets, welds, clamps or fasteners, or through integral forming with the vehicle body structure 12, for example, although the fuel filler tube 32 or other components of the fuel filler tube assembly 30 could be otherwise attached to the vehicle body structure 12. As shown, the first distal end 40 of the fuel filler tube 32 is generally connected to the fuel filler adaptor 34, as explained above, which is in turn mounted to the body panel 16. The second distal end 42 of the fuel filler tube 32 is likewise generally connected to the fuel reservoir 36, which may be attached to one or more of the components of the vehicle body structure 12.

The illustrated fuel filler tube assembly 30 further includes a plurality of mounting brackets 60 and 62. The first mounting bracket 60 attaches between the frame component 14b of the vehicle body structure 12 and the fuel filler tube 32 proximate the fuel reservoir 36 along the horizontal segment 46. The second mounting bracket 62 attaches between the wheelhouse panel 20 of the vehicle body structure 12 and the fuel filler tube 32 at the elbow portion 44.

Figure 2:
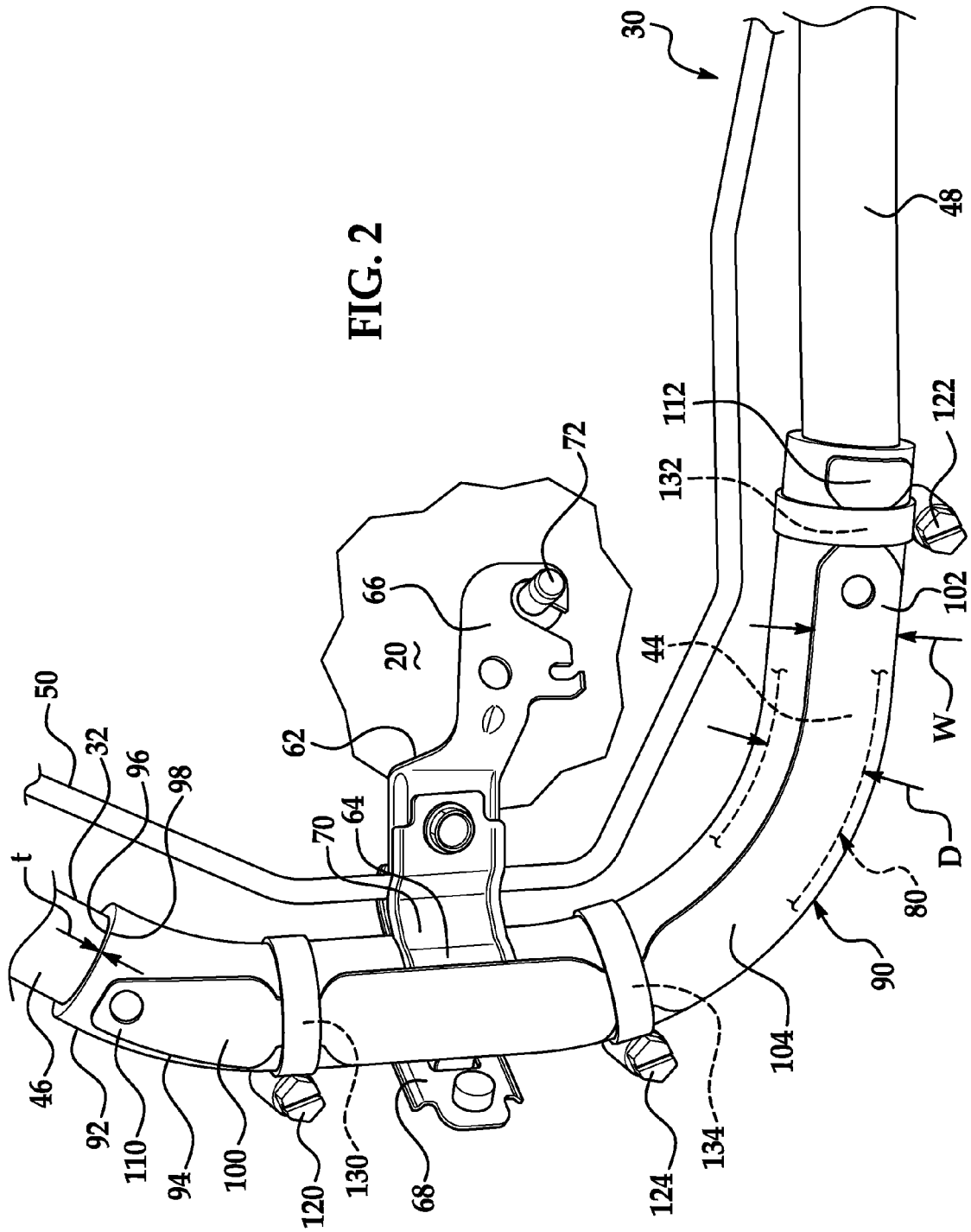
FIG. 2 is a detail perspective view of the fuel filler tube assembly of FIG. 1 showing a reinforcement structure for the fuel filler tube.
Figure 3:
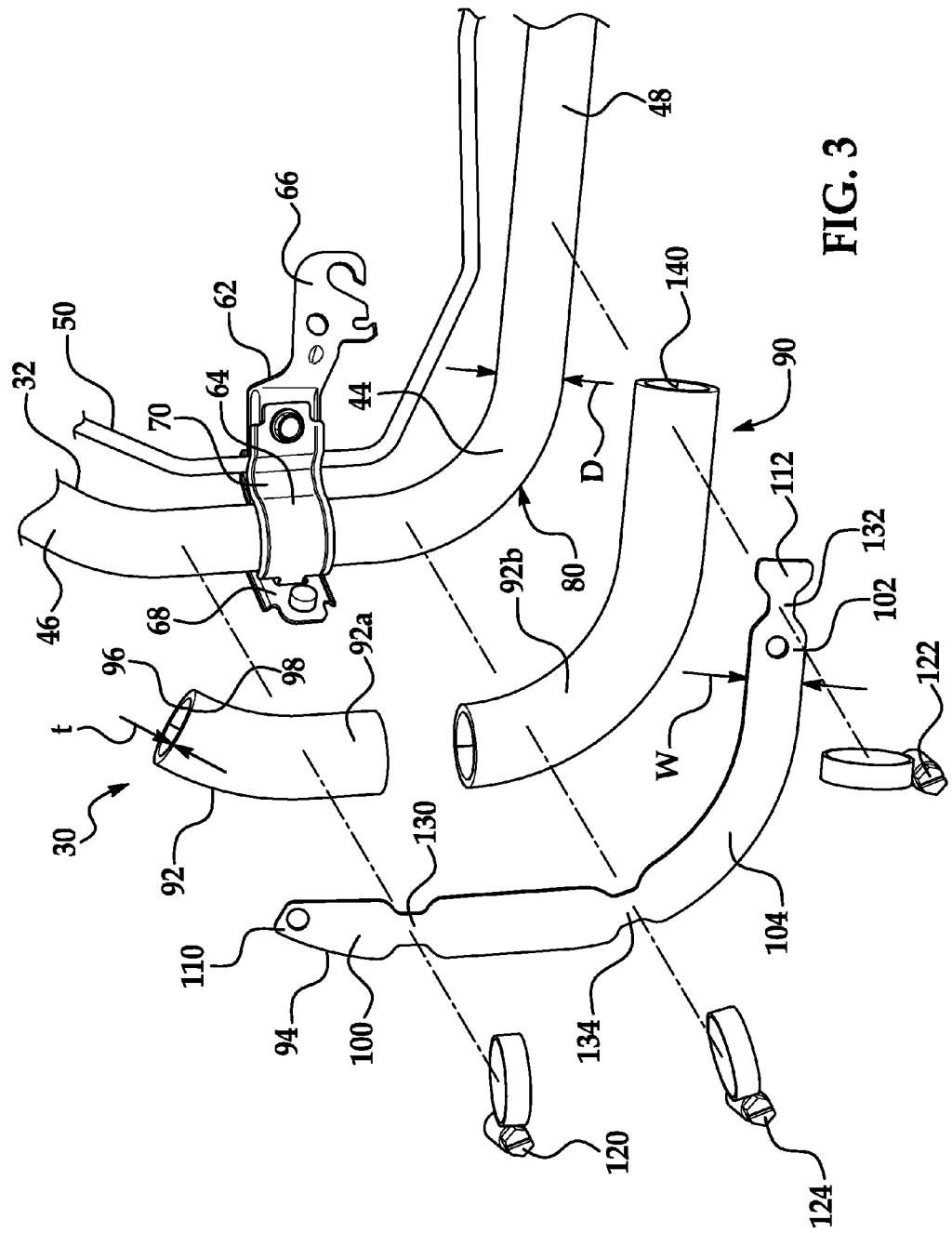
FIG. 3 is an exploded perspective view of the fuel filler tube and reinforcement structure shown in FIG. 2.

Additional details of the second mounting bracket 62 can be seen with further reference to FIGS. 2 and 3. The second mounting bracket 62 includes a fuel filler tube attachment portion 64 and a vehicle body structure attachment portion 66. The fuel filler tube attachment portion 64 attaches to the fuel filler tube 32 at or proximate to the elbow portion 44 by applying a clamping force with two clamping members 68 and 70 having opposed semi-circular portions that are collectively sized for receiving and circumscribing the fuel filler tube 32. The fuel filler tube attachment portion 64 similarly supports the recirculation tube 50 adjacent the fuel filler tube 32 by clamping the recirculation tube 50 between two opposed semi-circular portions of the clamping members 68 and 70 that are collectively sized for receiving and circumscribing the recirculation tube 50. Instead of clamping to the fuel filler tube 32 and to the recirculation tube 50, the fuel filler tube attachment portion 64 could alternatively be welded, fastened or otherwise attached to the fuel filler tube 32 and recirculation tube 50, for example, or could be formed integrally with the fuel filler tube 32 and/or recirculation tube 50.

The clamping member 68 extends beyond the clamping member 70 to form the vehicle body structure attachment portion 66, which is adapted for attachment to the wheelhouse panel 20 of the vehicle body structure 12. As shown, the vehicle body structure attachment portion 66 is configured for fastening to the wheelhouse panel 20 with a threaded fastener 72, although the vehicle body structure attachment portion 66 could alternatively be clamped, welded or otherwise attached to the wheelhouse panel 20 or to other portions of the vehicle body structure 12.

The fuel filler tube 32 can include one or more exposed segments along its length, such as the exemplary exposed segment 80. The exposed segment 80 of the fuel filler tube 32 can be defined by the spatial, geometrical and structural relationships between the fuel filler tube 32, the various components of the vehicle body structure 12 and/or the environment surrounding the vehicle body structure 12, for instance. As shown, the exposed segment 80 extends a partial length of the fuel filler tube 32, and generally includes the elbow portion 44 of the fuel filler tube 32, along with portions of the vertical segment 46 and the horizontal segment 48 immediately adjacent the elbow portion 44. The exposed segment 80 illustrated in the drawings and described herein is provided as a non-limiting example. It will be understood that the exposed segment 80 could be multiple discrete segments along the length of the fuel filler tube 32. Alternatively, all or a part of the exposed segment 80 could be defined otherwise than along a length of the fuel filler tube 32. For example, the exposed segment 80 could be or include one or more outwardly facing circumferential portions of the fuel filler tube 32.

The illustrated fuel filler assembly 30 includes features for reinforcing the exposed segment 80 of the fuel filler tube 32. Specifically, as shown in FIGS. 2 and 3, a reinforcement structure 90 is fitted to the exposed segment 80. As a non-limiting example, the reinforcement structure 90 may include layered reinforcement for the exposed segment 80, and in the illustrated example, includes a sleeve 92 disposed about the exposed segment 80 and a reinforcement plate 94 overlaying the sleeve 92. Although the sleeve 92 and the reinforcement plate 94 are shown as separate components, the sleeve 92 and the reinforcement plate 94 could be integrally formed with one another, for example.

The sleeve 92 generally provides an absorbent layer for the exposed segment 80 of the fuel filler tube 32. The configuration of the sleeve 92 may depend on the shape and size of the exposed segment 80. As shown, the exposed segment 80 extends a partial length of the fuel filler tube 32, and the sleeve 92 at least partially circumscribes the fuel filler tube 32 along the length of the exposed segment 80. In the illustrated example, where the exposed segment 80 has a circular cross section, the sleeve 92 is generally tubular and has an annular cross section, with an inner diameter 96 approximating the exterior of the fuel filler tube 32 along the exposed segment 80, an outer diameter 98, and a thickness t between the inner diameter 96 and the outer diameter 98. However, it will be understood that the generally tubular sleeve 90 is provided as a non-limiting example, and that the sleeve 90 could less than fully circumscribe the exposed segment 80. The sleeve 92 can be shaped in conformance with the contour of the exposed segment 80, for example, or could be composed of a flexible material suitable for adapting to the contour of the exposed segment 80.

The sleeve 92 may also be configured in accordance with other aspects of the fuel filler tube assembly 30. For instance, although the exposed segment 80 need not be coupled to the vehicle body structure 12, the second mounting bracket 62 of the illustrated fuel filler tube assembly 30 attaches between the wheelhouse panel 20 of the vehicle body structure 12 and fuel filler tube 32 along the exposed segment 80. In the illustrated example, the sleeve 92 includes a first sleeve portion 92a and a second sleeve portion 92b, which are opposedly disposed on the exposed segment 80 about the second mounting bracket 62.

As a non-limiting example, the sleeve 92 can be composed all or in part of an elastomeric material that preferably has additional fuel and/or chemical-resistant properties. For instance, the sleeve 92 can be composed of a NBR-PVC material with a thickness t of approximately 4 millimeters. Although the sleeve 92 is generally shown as a contiguous mass, it will be understood that the sleeve 92 may include interstitial vacancies, for example.

The reinforcement plate 94 overlays the sleeve 92 and generally provides an additional reinforcing layer of the reinforcement structure 90 for the exposed segment 80 of the fuel filler tube 32. The reinforcement plate 94 can be sized to overlay all of or a lesser portion of the sleeve 92. In the illustrated example, the reinforcement plate 94 extends along the length of the exposed segment 80. However, while the sleeve 92 circumscribes the fuel filler tube 32 along the length of the exposed segment 80, the reinforcement plate 94 is disposed about a lesser portion of the circumference of the fuel filler tube 32 along the exposed segment 80. As shown, the reinforcement plate 94 may, for example, have a width W approximating a diameter D of the exposed segment 80. In addition, the reinforcement plate 94 can overlay the second mounting bracket 62, although the reinforcement plate 94 could alternatively be disposed under the second mounting bracket 62, for example, or could be composed of multiple discrete parts opposedly disposed about the second mounting bracket 62.

As with the sleeve 92, the configuration of the reinforcement plate 94 may depend on the shape and size of the exposed segment 80. As shown, the reinforcement plate 94 has a generally curvilinear overall profile that approximates the contour of the exposed segment 80. Specifically, the reinforcement plate 94 includes a first substantially straight portion 100 extending vertically along the portions of the vertical segment 46 of the fuel filler tube 32 included in the exposed segment 80, a second substantially straight portion 102 extending horizontally along the portions of the horizontal segment 48 of the fuel filler tube 32 included in the exposed segment 80, and a curved portion 104 extending along the elbow portion 44. The first substantially straight portion 100 terminates at a first distal end 110 of the reinforcement plate 94, at a periphery of the exposed segment 80 along the vertical segment 46 of the fuel filler tube 32, while the second substantially straight portion 102 terminates at a second distal end 112 of the reinforcement plate 94, at a periphery of the exposed segment 80 along the horizontal segment 48.

The reinforcement structure 90 can include features for attaching the reinforcement plate 94 to the sleeve 92 along the exposed segment 80 of the fuel filler tube 32. As a non-limiting example, the reinforcement structure 90 includes a plurality of clamps 120, 122, 124 disposed around the sleeve 92 and the reinforcement plate 94 at various locations along the length of the exposed segment 80.

The clamps 120, 122, 124 are generally circular and circumscribe the sleeve 92 and the reinforcement plate 94. In the illustrated example, a first clamp 120 circumscribes the first sleeve portion 92a and a first attachment portion 130 of the reinforcement plate 94 adjacent the first distal end 110 of the reinforcement plate 94, a second clamp 122 circumscribes the second sleeve portion 92b and a second attachment portion 132 of the reinforcement plate 94 adjacent the second distal end 112 of the reinforcement plate 94, and a third clamp 124 circumscribes the second sleeve portion 92b and a third attachment portion 134 of the reinforcement plate 94 along the curved portion 104, although it will be understood that the number and/or location of the clamps 120, 122, 124 could vary.

The clamps 120, 122, 124 can be worm gear clamps, for example, although other clamps could be used. In addition, the reinforcement plate 94 could be otherwise attached to the sleeve 92. For instance, the reinforcement plate 94 could be integral with the sleeve 92, or could be adhered to the sleeve 92. Alternatively, the reinforcement plate 94 could be disposed to overlay the sleeve 92 through one or more couplings to the vehicle body structure 12 and/or the fuel filler tube assembly 30.

The reinforcement plate 94 can be maintained in a tangential orientation with respect to the exposed segment 80 by contouring the reinforcement plate 94 in its width direction according to the exterior cross sectional shape of the fuel filler tube 32 and/or sleeve 92 along the exposed segment 80, for example. In the illustrated example of the reinforcement structure 90, however, the reinforcement plate 94 is substantially flat. Where the reinforcement plate 94 extends outward of an exposed segment 80 and/or sleeve 92 having a circular or other curvilinear cross section, the width W of the reinforcement plate 94 can be necked down at each of the attachment portion 130, 132, 134, as shown, so that the reinforcement plate 94 is maintained in stable contact with the sleeve 90 in a tangential orientation with respect to the exposed segment 80 when the clamps 120, 122, 124 are disposed around the sleeve 92 and the reinforcement plate 94.

The reinforcement plate 94 can be configured to reinforce the exposed segment 80. As a non-limiting example, the reinforcement plate 94 can be composed all or in part of rigid material that preferably has additional fuel and/or chemical-resistant properties. For instance, the reinforcement plate 94 can be composed of electro-coated carbon steel material with a thickness of approximately 0.8 millimeters. Although the reinforcement plate 94 is generally shown as a contiguous mass, it will be understood that the reinforcement plate 94 may include interstitial vacancies, for example.

It can be seen that the reinforcement structure 90 can be quickly implemented, and can be installed either before or after the fuel filler tube 30 is installed with respect to the vehicle body structure 12. The sleeve 92, for example, may be a commercially available hose that defines a longitudinal slit 140 to permit quick disposition over the exposed segment 80. In addition, the reinforcement plate 94 can be economically constructed from flat stock material, and the clamps 120, 122, 124 can be readily available worm gear clamps.

It will be understood that the exposed segment 80 illustrated in the drawings and described herein is provided as a non-limiting example, and the components of the reinforcement structure 90 described herein can be adapted to protect multiple discrete exposed segments along the length of the fuel filler tube 32, for example, or to protect one or more exposed segments defined otherwise than along a length of the fuel filler tube 32 and/or recirculation tube 50. In an alternative example, if the exposed segment 80 is defined as a circumferential portion of the fuel filler tube 32, the sleeve 90 could circumscribe the exposed segment 80 without fully circumscribing the fuel filler tube 32.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel filler tube assembly for a vehicle, comprising:
   a fuel filler tube configured to fluidly connect a fuel filler adaptor with a fuel reservoir and having an exposed segment;
   an elastomeric sleeve at least partially circumscribing the exposed segment; and
   a rigid reinforcement plate at least partially overlaying the sleeve, the plate extending longitudinally along a circumferential portion of the exposed segment and shaped to approximate a contour of the exposed segment.

2. The fuel filler tube assembly of claim 1, further comprising:
   a mounting bracket including a fuel filler tube attachment portion and a vehicle body structure attachment portion, the fuel filler tube attachment portion attached to the fuel filler tube along the exposed segment; and
   the sleeve including a first sleeve and a second sleeve oppositely disposed about the fuel filler tube attachment portion of the mounting bracket.

3. The fuel filler assembly of claim 2, further comprising:
   a recirculation tube configured to fluidly connect to the fuel reservoir and extending in proximity with the fuel filler tube, wherein the mounting bracket includes a recirculation tube attachment portion attached to the recirculation tube.

4. The fuel filler tube assembly of claim 2, wherein the plate overlays the fuel filler tube attachment portion of the mounting bracket.

5. The fuel filler tube assembly of claim 1, wherein the plate is attached to the sleeve with at least one circular clamp circumscribing the sleeve and an attachment portion of the plate.

6. The fuel filler tube assembly of claim 5, wherein the plate is substantially flat, and the attachment portion of the plate is necked down from an outer profile of the plate.

7. The fuel filler tube assembly of claim 1, wherein the plate includes a plurality of longitudinally spaced attachment portions and is attached to the sleeve at each attachment portion with a circular clamp circumscribing the sleeve and the attachment portion.

8. The fuel filler tube assembly of claim 7, wherein the plate includes a first attachment portion disposed at a first end of the plate, a second attachment portion disposed at a second end of the plate opposite the first end, and a third attachment portion disposed between the first and second attachment portions.

9. The fuel filler tube assembly of claim 1, wherein a maximal width of the plate is less than a diameter of the fuel filler tube along the exposed segment.

10. The fuel filler tube assembly of claim 1, wherein the exposed segment includes an elbow of the fuel filler tube, the plate extending along the elbow and shaped to approximate a contour of the elbow.

11. A vehicle, comprising:
a vehicle body structure housing a fuel reservoir and including a fuel filler adaptor at an exterior thereof;
a fuel filler tube routed within the vehicle body structure and configured to fluidly connect the fuel filler adaptor with the fuel reservoir, the fuel filler tube having an exposed segment;
an elastomeric sleeve at least partially circumscribing the exposed segment; and
a rigid reinforcement plate at least partially overlaying the sleeve, the plate extending longitudinally along a circumferential portion of the exposed segment and shaped to approximate a contour of the exposed segment.

12. The vehicle of claim 11, further comprising:
a mounting bracket including a fuel filler tube attachment portion attached to the fuel filler tube along the exposed segment and a vehicle body structure attachment portion attached to the vehicle body structure; and
the sleeve including a first sleeve and a second sleeve oppositely disposed about the fuel filler tube attachment portion of the mounting bracket, wherein:
the plate overlays the first sleeve, the second sleeve and the fuel filler tube attachment portion of the mounting bracket.

13. The vehicle of claim 12, further comprising:
a recirculation tube configured to fluidly connect to the fuel reservoir and extending in proximity with the fuel filler tube, wherein the mounting bracket includes a recirculation tube attachment portion attached to the recirculation tube.

14. The vehicle of claim 11, wherein:
the plate includes a first attachment portion disposed at a first end of the plate, a second attachment portion disposed at a second end of the plate opposite the first end, and a third attachment portion disposed between the first and second attachment portions, and
the plate is attached to the sleeve at each attachment portion with a circular clamp circumscribing the sleeve and the attachment portion.

15. The vehicle of claim 14, wherein the plate is substantially flat, and the attachment portions of the plate are necked down from an outer profile of the plate.

16. The vehicle of claim 11, wherein a maximal width of the plate is less than a diameter of the fuel filler tube along the exposed segment.

17. The vehicle of claim 11, wherein the exposed segment includes an elbow of the fuel filler tube, the plate extending along the elbow and shaped to approximate a contour of the elbow.

* * * * *